United States Patent [19]

Simpson et al.

[11] Patent Number: 4,464,115

[45] Date of Patent: Aug. 7, 1984

[54] PULSED LASER RANGE FINDER TRAINING OR TEST DEVICE

[75] Inventors: Anthony Simpson, Godalming; Stuart M. Peterkin, Effingham; Brian T. Brooksby, Eastleigh, all of England

[73] Assignee: Detras Training Aids Limited, Alresford, England

[21] Appl. No.: 452,056

[22] Filed: Dec. 22, 1982

[30] Foreign Application Priority Data

Dec. 23, 1981 [GB] United Kingdom ................. 8138807

[51] Int. Cl.³ ............................................... G09B 9/00
[52] U.S. Cl. .......................................... 434/27; 434/21; 73/432 L; 73/432 SD
[58] Field of Search ...................... 434/27, 21; 73/1 R, 73/432 L, 432 SD

[56] References Cited

U.S. PATENT DOCUMENTS 3,788,733 1/1974 Breglia et al. ..................... 434/21 X
3,916,536 11/1975 Mohon et al. ......................... 434/21

Primary Examiner—William H. Grieb

[57] ABSTRACT

A training or test device is provided operable to allow actual firing of a pulsed laser range finder in safe conditions for training or test purposes. This device, having a reflected laser beam radiation receiver and an associated range distance indicator, includes a pulsed laser light trap having a housing (2) attachable over an output aperture of the laser to receive and dissipate safely a beam of radiation therefrom without emission of an eye damaging amount of radiation. The device includes a pair of surfaces (5,6) in the housing for receiving an incident laser beam from the range finder, when fired, and for dissipating the received laser beam, at least one detector (7) operable to register the presence of the laser beam in the housing (2) and provide a corresponding output signal, a timer for receiving the output signal from the at least one detector (7) and imparting a delay period to the output signal corresponding to the time normally taken for the laser beam to reach an object at a predetermined range and return therefrom and a source (10) of a simulated return signal operable in response to the delayed output signal received from the timer to provide a simulated reflected laser beam return signal. The simulated return signal is fed to the reflected laser beam radiation receiver for consequent operation of the associated range distance indicator.

16 Claims, 6 Drawing Figures

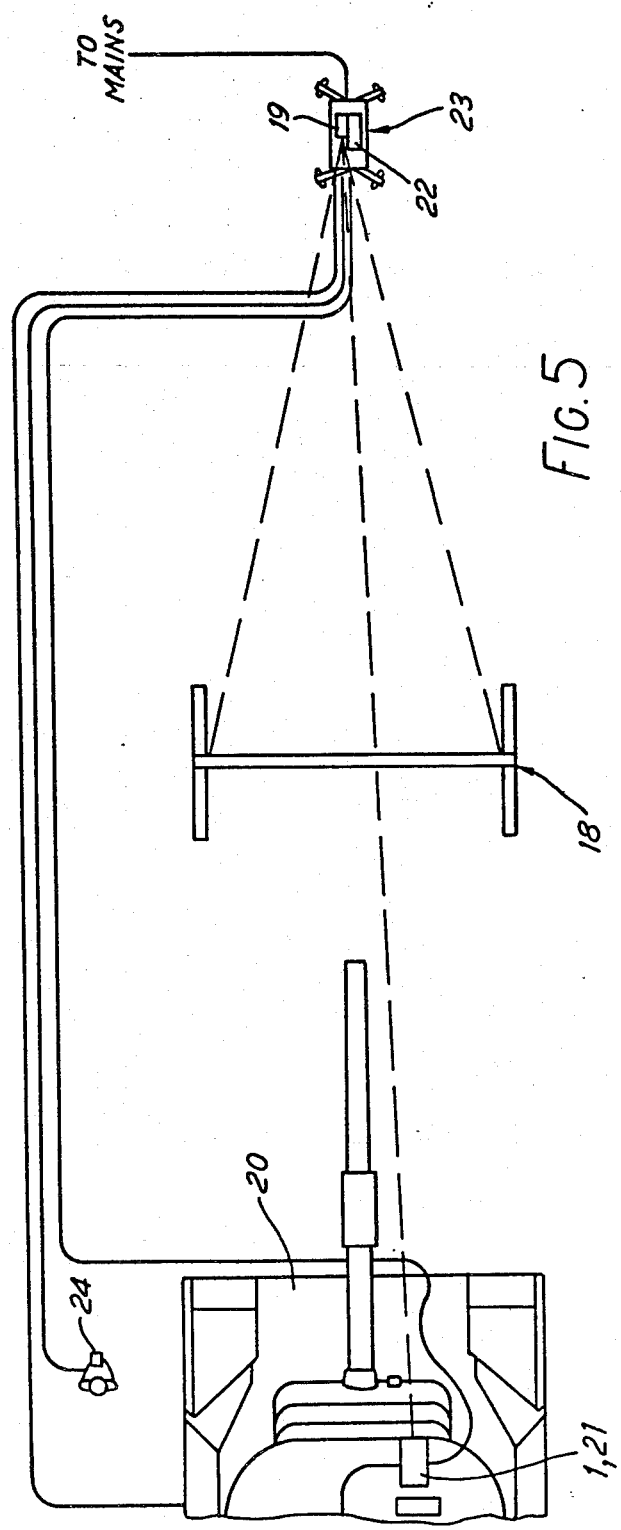

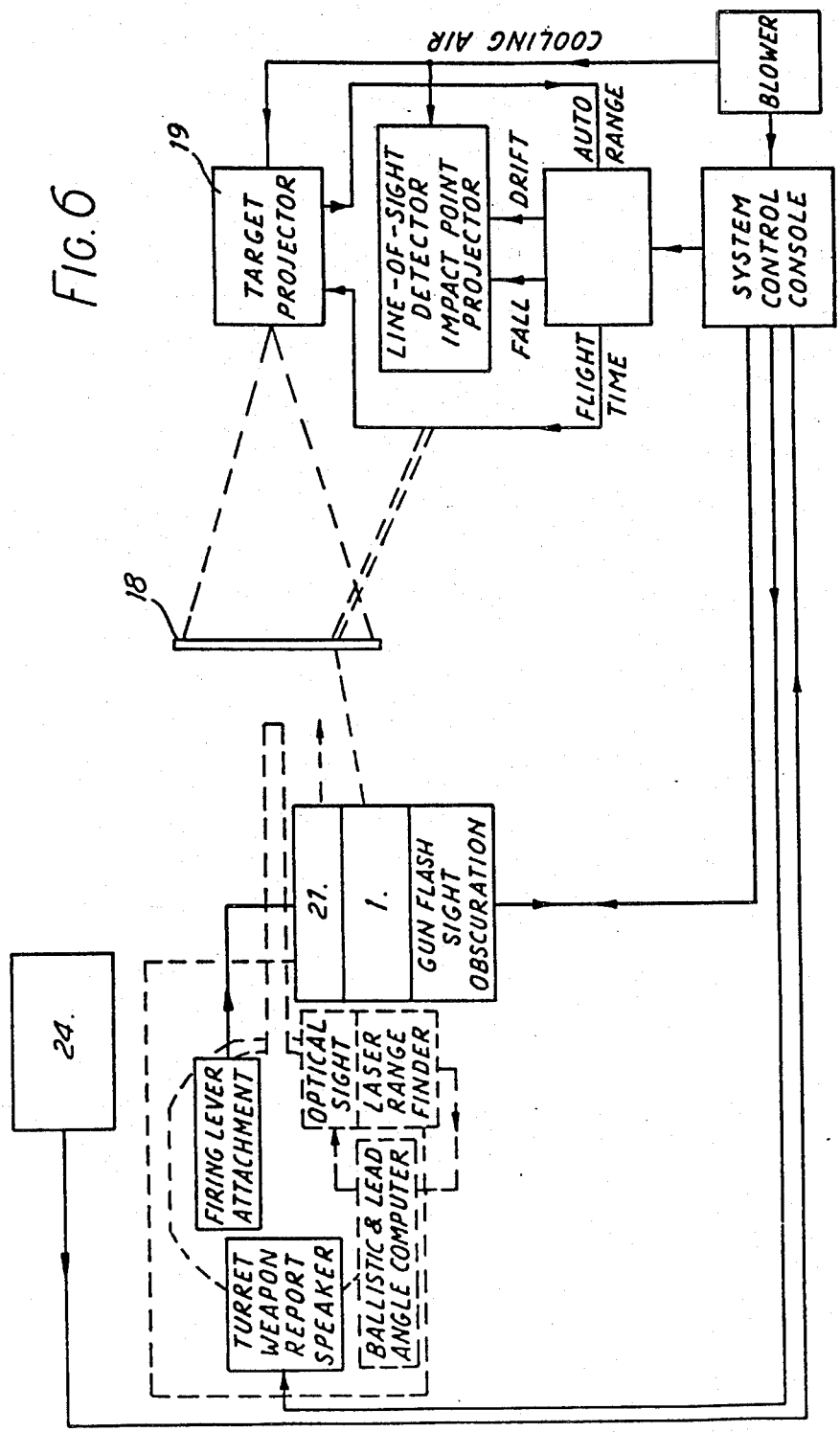

PULSED LASER RANGE FINDER TRAINING OR TEST DEVICE

FIELD OF INVENTION

This invention relates to a training or test device for a pulsed laser range finder operable to allow actual firing in safe conditions of a pulsed laser range finder for training or test purposes.

BACKGROUND OF THE INVENTION AND PRIOR ART

Pulsed lasers conventionally used for range finding purposes such as on current main battle tanks operate on the principle of estimating range as a function of the time taken for a pulsed laser beam aimed at a target, usually via an optical sight, to reach the target and be reflected therefrom back to a reflected laser beam radiation receiver on the range finder to actuate an associated range distance indicator. These laser beams conveniently are produced by a ruby laser and generally have a very short pulsed duration and high power output over an effective distance of up to 10 kilometers.

Current main battle tanks fitted with such pulsed laser range finders generally operate with what is known as Integrated Fire Control System (IFCS). Basically IFCS means that a main armament firing sequence on the tank is controlled by a ballistics/main armament lead angle computer linked to the laser range finder, the primary optical gun sight and the armament movement controls such that once a target has been selected visually in the gun sight by the gunner it is ranged on by the laser range finder and the armament automatically brought to bear for the correct range and deflection, by the computer. It is only necessary then for the gunner to fire the armament on completion of the automatic gun laying sequence. However if the gunner does not fire in a very short time from completion of the gun laying sequence, either by design or by error, the computer disengages and the whole gun laying sequence must be carried out again before the armament can be fired. Thus the operation of a tank armament fitted with IFCS is a highly skilled matter requiring considerable practice as slow operation can be a matter of life or death to the tank crew.

Unfortunately it is difficult to practice operate a tank armament fitted with IFCS either on a live firing range or on a conventional tank gunnery training simulator. This is because the short pulse duration, high power output and long range capabilities of the laser beam in the laser range finder means that a viewer of the beam may not see the beam when fired, and thus be able to turn away, before permanent eye damage has been inflicted. Live range training facilities which allow use of the laser range finder with complete safety are few and far between with the result that live firing practice using the full IFCS system and tank armament is difficult to carry out often enough to ensure adequate training. Hence recourse has been had to a tank gunnery training simulator for training purposes.

However conventional tank gunnery training systems operate by providing a dummy tank turret coupled to a screen on which a moving target image is projected from a film for simulated engagement by the dummy turret armament. Such a system has the drawback that it does not operate with the actual tank armament, does not simulate operation of the laser range finder and thus cannot give training on the IFCS system which requires the essential use of the laser range finder to operate. Attempts have been made to alleviate these drawbacks by providing a more sophisticated tank gunnery training system such as that described and claimed in UK patent application No. 8004200 (published under the number 2 047 856A) in the name of Brian Thomas Brooksby, which allows use with the actual tank armament. Nevertheless even the latter tank gunnery training system does not permit use of the laser range finder facility and thus cannot provide crew training on the IFCS system other than in a degraded mode in which the laser range finder is inoperable, or at best replaced by a simulated range signal read off the tank gunnery training simulator and inputted manually on the tank range indicator. This means that the primary optical sight and ballistic/lead angle computer cannot be used in conjunction with the laser range finder and the tank gunner can only use the optical sight reticle and target range estimation or optical sight and the simulated range signal inputted into the computer.

The basic problem of use of the laser range finder is the problem of safety, which not only inhibits training use of the laser range finder and of an IFCS tank fitted with the laser range finder, but which inhibits safe and effective testing of the operating efficiency of the laser range finder itself. Safe testing of the laser range finder is particularly desirable to avoid going into combat situations with a defective laser range finder on a tank thereby preventing use of the IFCS and necessitating operation of the tank armament in a degraded mode.

OBJECT OF THE INVENTION

An object of the invention is to provide a training or test device for a pulsed laser range finder operable to allow actual firing of the laser range finder in safe conditions for training and/or test purposes.

Another object of the invention is to provide a test device for testing simply and safely, whether or not a laser of a laser range finder is functioning, the laser power output within broad limits and/or the correct operation of the laser range finders detector system.

A further object of this invention is to provide a test device for testing simply and safely the range finding portion of a tank laser range finder system with actual firing of the laser.

Yet another object of the invention is to provide a training or test device for a pulsed laser range finder, such as that fitted to a tank, which can be used in conjunction with the primary optical sight of the tank for training and/or test purposes.

SUMMARY OF THE INVENTION

According to the present invention there is provided a training test device for a pulsed laser range finder having a reflected laser beam radiation receiver and an associated range distance indicator, which device includes a pulsed laser light trap having a housing attachable over an output aperture of the laser to receive and dissipate safely a beam of radiation therefrom without emission of an eye damaging amount of radiation, means in the housing for receiving an incident laser beam from the range finder, when fired, and for dissipating the received laser beam, at least one detector operable to register the presence of the laser beam in the housing and provide a corresponding output signal, a timer for receiving the output signal from the at least one detector and imparting a delay period to the output signal corresponding to the time normally taken for the laser beam to reach an object at a predetermined range and return therefrom, a source of a simulated return signal operable in response to the delayed output signal received from the timer to provide a simulated reflected laser beam return signal, and means for feeding the simulated return signal to the reflected laser beam radiation receiver for consequent operation of the associated range distance indicator.

Preferably the means for receiving and dissipating an incident laser beam include a first reflecting and diminishing surface locatable at 45° to the incident laser beam axis and a second reflecting and diminishing surface parallel to and spaced from the first reflecting and diminishing surface such that when the incident laser beam strikes the first reflecting and diminishing surface it is diminished in intensity and reflected onto the second reflecting and diminishing surface and from thence scattered and reflected to the detector. Conveniently the first and second reflecting and diminishing surfaces are each provided on a respective right angled prism both of which prisms are made from transparent plastics material advantageously loaded with black pigment. Conveniently the second reflecting and diminishing surface is provided with a plurality of depressions therein to aid scattering of the incident laser beam.

The source of a simulated return signal may be a flash bulb located separately from the pulsed laser light trap. Advantageously the source of a simulated return signal includes an optical condensor, a diffuser screen, an image lens system and an adjustable image attenuator for controlling the signal presented to the means for feeding the simulated return signal to the reflected laser beam radiation receiver. The device may include a source of power for the simulated return signal source or the simulated return signal source may receive power from a tank gunnery training system or from a tank power system itself.

The means for feeding the simulated return signal preferably includes an aperture alignable with the input aperture of the reflected laser beam radiation receiver. This aperture may be constructed to communicate directly with the input aperture of the reflected laser beam radiation receiver when the device is intended purely for test purposes or alternatively may be constructed to communicate with the reflected laser beam radiation receiver via a primary optical sight associated with the pulsed laser range finder. In the latter case the means for feeding the simulated return signal to the reflected laser beam radiation receiver includes at least one semi-transparent partially reflecting mirror arranged so as to be at an angle of 45° to the line of sight of the primary optical sight when the device is operatively fitted as aforesaid such that a simulated return signal received from the flash bulb is reflected by the semi-transparent mirror along the line of sight of the primary optical sight for cooperation with a similar mirror in the optical sight which reflects the reflected simulated return signal into the reflected laser beam radiation receiver. Advantageously, the two semi-transparent mirrors are coated to transmit visible light but reflect the laser range finder infra red energy.

The timer may be manually operable to provide a delayed period which can be selectively varied to correspond to a number of selected ranges. Alternatively the timer may be constructed to receive a target range input, variable or static, from a tank gunnery training simulator so that the delay period is controlled and varied by said target range input.

Other objects and features of the invention will become apparent from the following detailed description of preferred but non-limitative embodiments and the accompanying drawings made a part hereof and to which reference is made.

BRIEF DESCRIPTION OF THE DRAWINGS

FIG. 5 is a plan view from above of FIG. 4, and FIG. 6 is a schematic block diagram of the control system of the arrangement of FIGS. 4 and 5.

Figure 1:
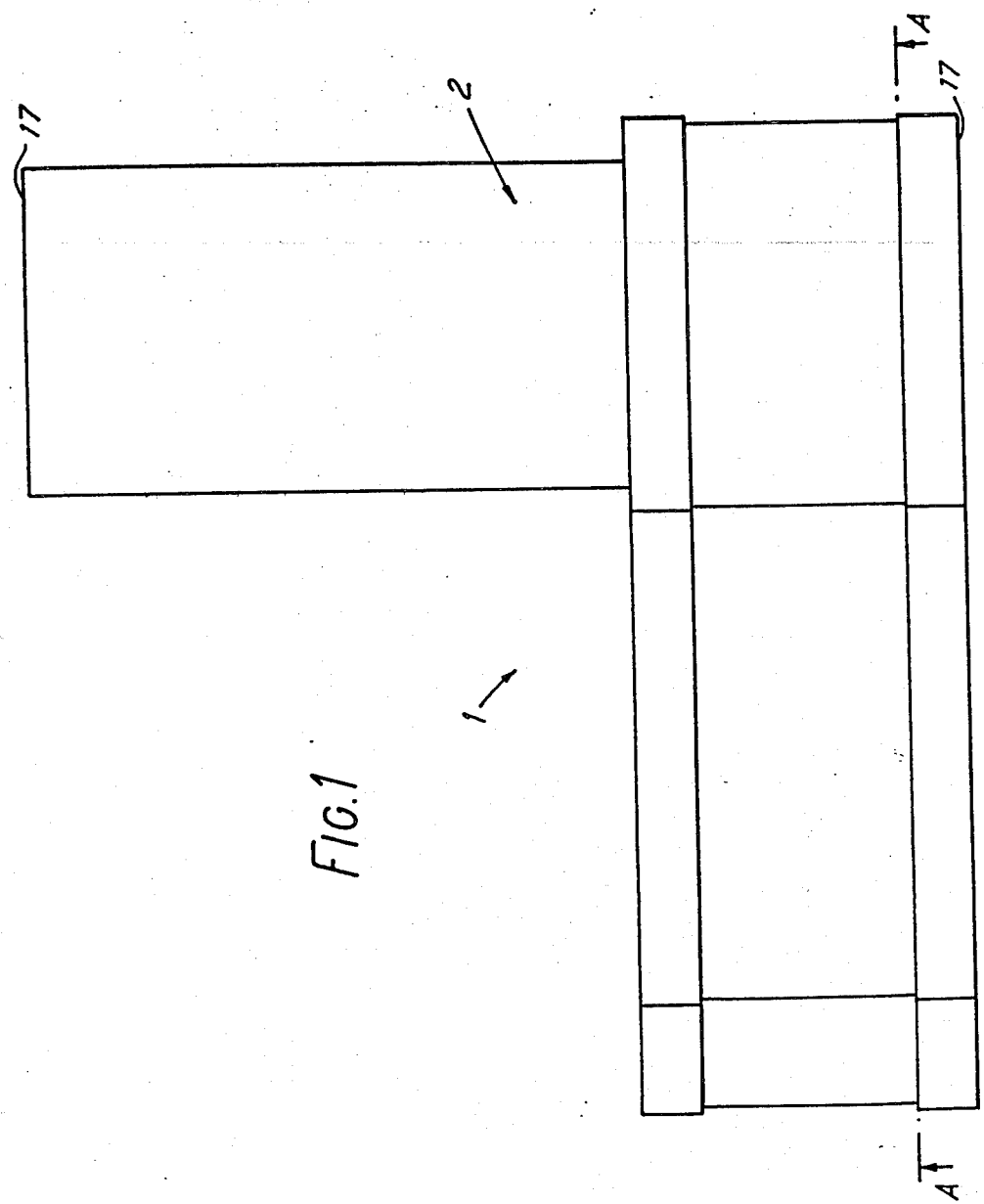
FIG. 1 is a top view of a training or test device according to one embodiment of the present invention.
Figure 2:
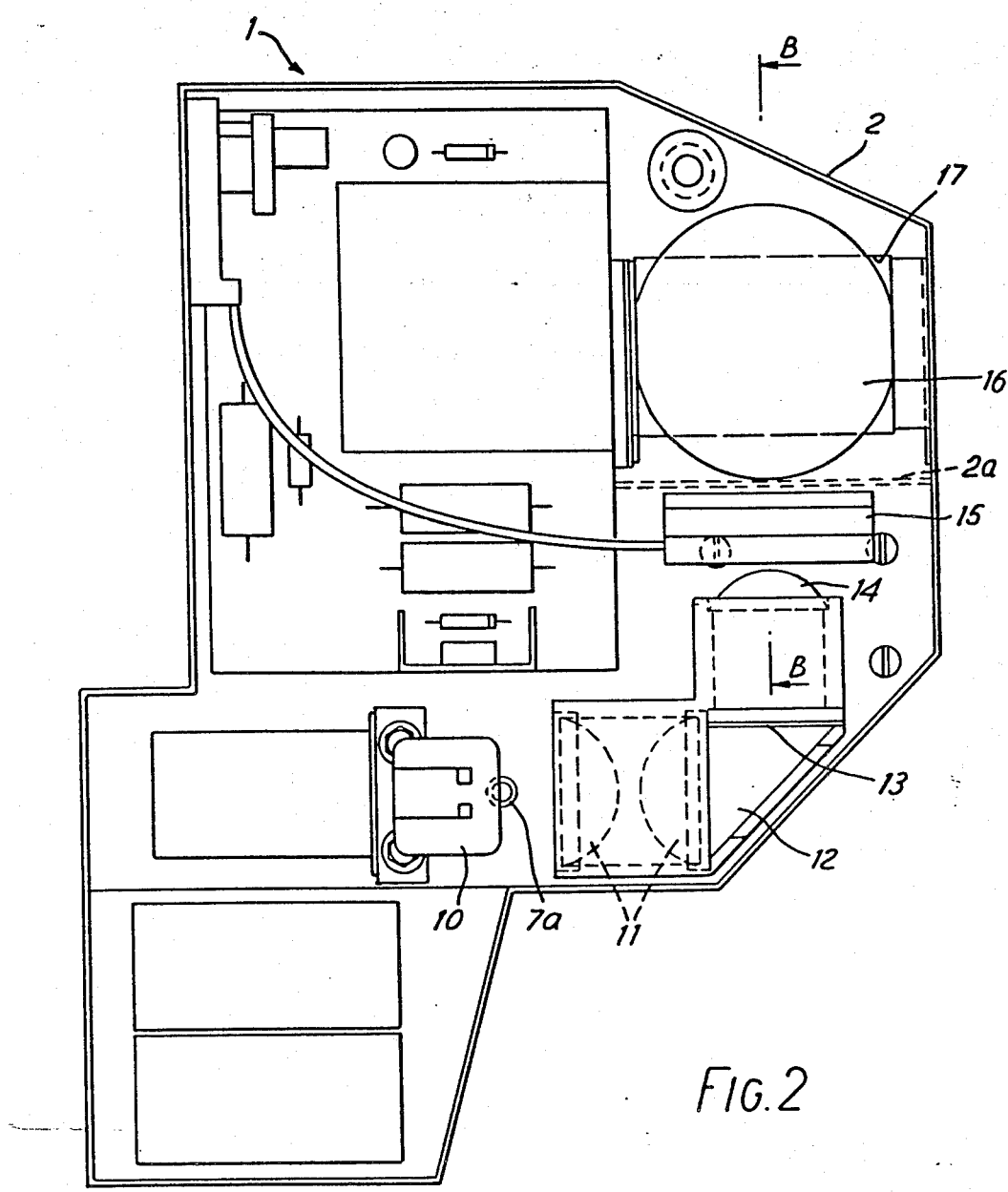
FIG. 2 is a vertical sectional view taken on line A—A of FIG. 1.
Figure 3:
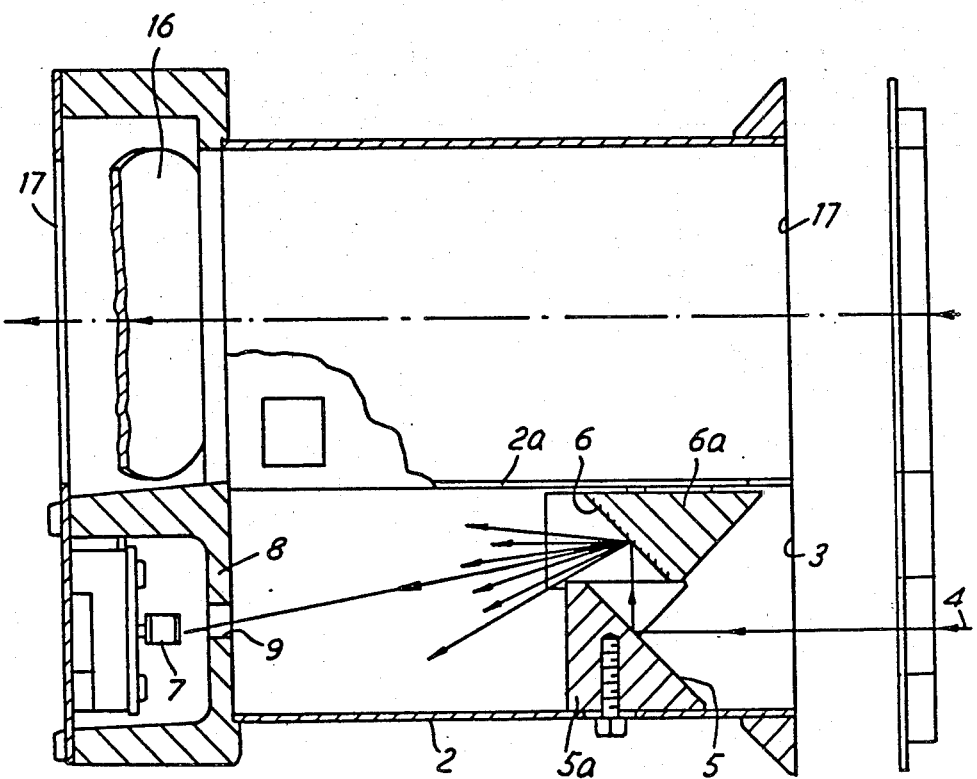
FIG. 3 is a vertical sectional view taken on line B—B of FIG. 2.

A training or test device for a pulsed laser range finder according to one embodiment of the invention is shown in FIGS. 1 to 3. This device 1 is intended for use with a pulsed laser range finder, not shown, having a reflected laser beam radiation receiver and an associated range distance indicator. For convenience such a device will be described for use with a pulsed laser range finder of a main battle tank but it is also to be understood that such a device is also suitable for use with a missile launcher having a pulsed laser range finder.

Figure 4:
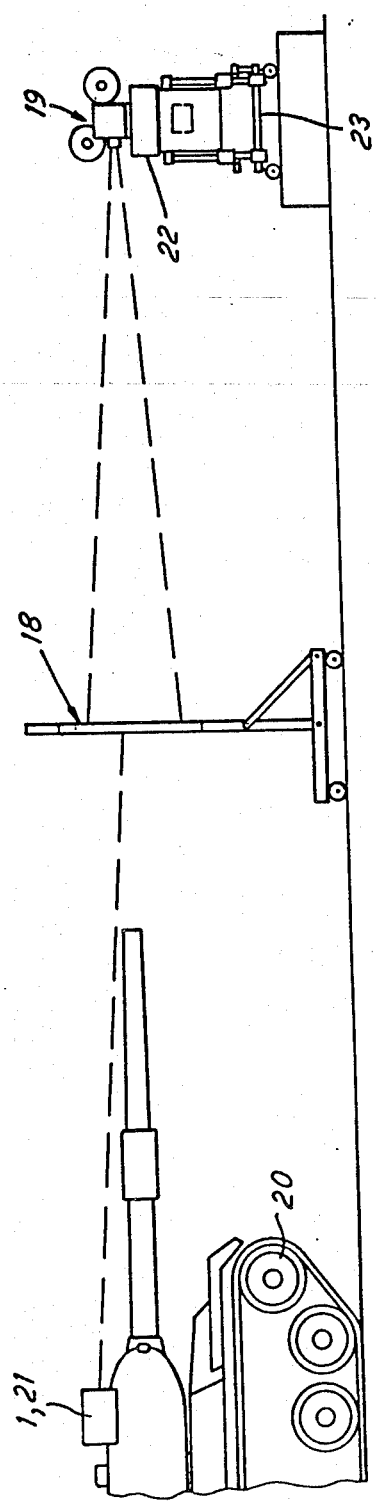
FIG. 4 is a schematic diagram showing in elevation a tank in operative association with a pulsed laser range finder training or test device of FIGS. 1-3, and a tank gunnery training system according to U.K. No. 8004200.

The device includes a pulsed laser light trap having a housing 2 attachable over an output aperture of the laser of a pulsed laser range finder, as shown in FIG. 4, to receive and dissipate safely a beam of radiation therefrom without emission of an eye damaging amount of radiation. To this end the housing 2 is constructed of heavy duty material such as steel and provided with any convenient means of ensuring rapid and safe attachment over the laser beam output aperture. Generally the laser range finder used on a main battle tank is housed in a dome-shaped blister located on one side of the tank turret and conveniently the housing is appropriately shaped or provided with a shaped mount such as to conform closely to the contours of the blister around the laser beam output aperture. The housing may be secured to the blister in any convenient manner such as by means of clamping straps around the blister or clamping fingers engaged in the laser beam output aperture and may be provided with a safety seal, conveniently of rubber, between the laser beam output aperture and the input aperture 3 of the trap housing 2.

The housing 2 as shown incorporates means for receiving an incident laser beam from the range finder via the aperture 3 and dissipating the received laser beam 4. In the illustrated embodiment this means includes a first reflecting and diminishing surface 5 so located in the housing 2 as to be at 45° to the axis of the incident laser beam 4 and a second reflecting and diminishing surface 6 arranged in the housing 2 parallel to and spaced apart from the first surface 5 so that the laser beam 4 strikes the first surface 5 and is diminished and reflected thereby onto the second surface 6 and from thence scattered and reflected in the housing 2. Conveniently the first and second surfaces 5 and 6 are each provided on right angled prisms 5a and 6a respectively made from transparent plastics material such as polyester resin loaded with black pigment conveniently carbon black. The black pigment assists in deflecting, diminishing and reflecting the incident laser beam 4. Additionally to this end the second surface 6 is provided with a plurality of depressions 6b therein which conveniently are in the form of preferably conical drillings which have the effect of scattering the incident laser beam 4 falling thereon as shown in FIG. 3. Alternatively the surfaces 5 and 6 may be provided by two spaced sheets of glass converging from the laser input side of the device. Preferably these sheets are each provided with a coating of a laser beam absorbing material.

The device includes at least one detector 7 arranged, as shown in FIG. 3, inside the housing 2 behind a baffle 8 provided with an opening 9 therethrough through which a small amount of radiation from the incident laser beam reflected and scattered from the second surface 6 can impinge on the detector 7. The detector is conveniently a high speed PIN diode (single chip silicon photodetector) which is operable to register the presence of the laser beam in the housing 2 and provide a corresponding output signal. Although only one such detector 7 has been shown in the illustrated embodiment it is alternatively possible to provide a series of such detectors by means of which an output signal indicative of the power output of the laser beam can be received.

The training or test device of the invention also includes a timer (not shown) for receiving the output signal from the at least one detector 7 and imparting a delay period to the output signal corresponding to the time normally taken for the laser beam 4 to reach an object, i.e. a target, at a predetermined range and return therefrom. This timer may be a crystal clock, conveniently functioning in the range of from 20 to 50 mega cycles. The device also includes a source of a simulated return signal operable in response to the delayed output signal received from the timer to provide a simulated reflected laser beam return signal. This source conveniently is in the form of a high intensity flash bulb 10 as shown in FIG. 2 although alternatively it could be in the form of an array of light emitting diodes or a laser diode. The flash bulb is associated with an optical condensor 11, a right angled return prism 12 provided with a reflecting surface so that the flash image produced by the flash bulb 10 passes through the condensor 11, is reflected through 90° by the prism 12 passes through a diffuser screen 13 and an image lens 14 and an adjustable attenuator 15 for presentation to means for feeding the simulated return signal to the reflected laser beam radiation receiver. The attenuator 15 may be a pair of relatively rotatable polarising filters controlled via a cable and gear adjustment means to vary the amount of light transmitted. Alternatively the attenuator 15 could be a mechanical iris with or without polarising filters.

The means for feeding the simulated return signal to the reflected laser beam radiation receiver can take several forms depending upon the intended use of the device. In order to provide a simple device for testing only if the laser of a laser range finder such as fitted to a main battle tank, is operating it is merely necessary for the means for feeding the simulated return signal to the reflected laser beam radiation receiver to include an aperture alignable with the input aperture of the reflected laser beam radiation receiver. Such a device can provide a self contained test unit that can measure the laser power to ensure that it is within broad limits and that the laser is firing. The simulated return signal can be adjusted in brightness so that a test can be made of the laser range finder's detector system within broad limits. To enable such a device to be portable the source of the simulated return signal and the timer can be provided with a power source such as a nickel-cadmium battery although alternatively the power source can be provided by the tank itself. Additionally, if desired, such a test device can be provided with manually variable delay periods which can be selected corresponding to desired ranges to afford a means of testing the range finding portion of the tank range finder system. With such a device the laser range finder on a tank can be quickly tested prior to use in combat. As such a test device is only intended for simply testing whether or not the laser is operating and operating within certain broad limits and whether the range finder is likewise operating within certain broad limits, there is no need to include any provision for the optical sight system of the tank to be utilised in conjunction with the test device.

However it is desirable to provide an alternative training or test device for a pulsed laser range finder such as fitted to a tank which can be used in conjunction with the primary optical sight of the tank either for training or test purposes. To this end the means for feeding the simulated return signal to the reflected laser beam radiation receiver incorporates means whereby the simulated return signal can be passed through the primary optical sight to the reflected laser beam radiation receiver on the tank, without the simulated return signal flash impinging on the eye of the gunner looking through the primary optical sight. As shown in FIG. 2, this means includes a semi-silvered partially transparent and partially reflecting mirror arranged in the housing 2 at 45° across the line of sight of the primary optical sight when the device is operatively connected thereto. The mirror 16 also makes an angle of 45° with the axis of the simulated return signal flash received from the attenuator 15. Thus when the device is operatively associated with a laser range finder and a primary optical sight of a tank the housing input aperture 3 will be aligned in a laser sealed manner with the laser beam outlet aperture on the tank and a sight aperture window 17 in the housing 2 will be aligned with the primary optical sight of the tank. Of course a baffle 2a is located between the light trap portion of the housing 2 containing the detector 7 and surfaces 5 and 6 and the portion of the housing 2 containing the flash bulb 10 and mirror 16 so that there is no chance of an eye damaging amount of radiation from the laser beam impinging on the surfaces 5 and 6 being passed via the mirror 16 back into the eye of a user of the primary optical sight. All that is passed through the primary optical sight is the simulated return signal flash from the flash bulb 10 which is reflected by the mirror 16 into the primary optical sight where it is reflected at 90° to the axis of sight of the primary optical gun sight by another semi-transparent reflecting mirror arranged at 45° to the line of sight of the primary optical sight within the sight itself. Such a second mirror is customary with optical guns sights of this nature and the simulated return flash is reflected by the second mirror into the reflected laser beam radiation receiver of the tank which it causes to operate in the usual way together with the associated range distance indicator. At all times the line of sight through the primary optical gun sight is unimpeded as it passes through the mirror in the gun sight and the semitransparent mirror 16 and windows 17. If necessary the mirror 16 and the similar mirror in the gun sight itself may be coated with infra red energy absorbing material and the gun sight optics can be provided with an infra red filter in order to reduce any possibility of eye damaging radiation being passed to the user of the gun sight.

The device as just described can also be used as a simple test device to indicate whether or not the laser on a tank laser range finder is operating or can be used by appropriate choice of the delay signal to indicate the performance of the laser range finder at one or more selectable simulated ranges. With the power supply for the flash bulb 10 and delay timer being provided either by a built in power source (not shown) or a power source on the user tank and with the device operatively attached to the tank over the laser beam output aperture and the primary optical gun sight aperture as aforesaid it is possible to fire the laser onto the surfaces 5 and 6 without any escape of the laser beam radiation from the housing 2. The presence or absence of the laser beam reflected from the surface 6 is detected by the detector 7 and an output signal passed therefrom to the delay timer. At the same time the detector 7 triggers an indicator bulb on the exterior of the housing 2. Obviously if no laser beam radiation is detected by the detector 7 the laser beam is either not firing or firing at an unacceptably low power level. A further indicator bulb may be provided on the exterior of the housing 2 which is triggered by a further detector diode 7a located near the flash bulb 10 to indicate that the flash bulb has fired. If the laser beam has fired then the output signal is received from the detector 7 at the timer and passed after an appropriate delay period corresponding either to the fixed range of the device or a selected range if the range is variable on the device, to the source of the simulated return signal to fire the flash bulb 10 and pass a flash of light via the mirror 16 back into the primary optical sight and from the incorporated mirror therein into the reflected laser beam radiation receiver on the tank. The received simulated reflected laser beam return signal causes the reflected laser beam radiation receiver to operate the associated range distance indicator and the indicated range can be checked with the known simulated range of the device, thereby affording an accurate check on the range finding distance performance of the tank laser range finder.

As previously pointed out such a device does not interfere with the operation of the primary optical gun sight on the tank and because of this it is possible to use the device of the present invention for training a crew of a tank fitted with IFCS in the use of this IFCS using the full IFCS capabilities and with actual firing of the laser range finder in completely safe conditions. Conveniently this may be done using a weapon training simulator such as that described and claimed in the co-pending application by Brian Thomas Brooksby, No. 8004200 entitled "Projected Image Target Apparatus". Such apparatus comprises, as shown generally in FIGS. 4, 5 and 6, a screen 18, conveniently a rear projection screen, a projector 19 for projecting a target image onto the screen 18, means 21 for projecting from the tank 20 a first light beam onto the screen 18 along the line of sight of the tank gun. This line of sight projector 21 conveniently is associated with the primary optical sight on the tank and is used to indicate on the screen as a point of visible light, the actual line of sight of the tank gun. Means are provided for projecting a second light beam onto the screen which second light beam projector 22 is associated with the target projector 19. Control means are provided for controlling operation of the projector 19 and the means for projecting the first and second light beams. This control means includes means for tracking movement of the point of contact of the first light beam from the projector 21 and the screen and means are provided which upon firing, that is simulated firing, of the tank gun utilises the position that the point of contact of the first light beam had at the instant of firing the gun as a datum point relative to which the point of contact of the second light beam from the projector 22 with the screen is moved to a corrected position which simulates the fall and drift of the simulated projectile fired by the tank gun and represents the point of impact of the projectile relative to the point of aim of the tank gun at the incident of firing. The target image projector 19 is located on the reverse side of the screen 18 with respect to the tank which is arranged at a distance of approximately six meters in front of the screen 18. Thus the device of the present invention permits the tank gunner to look through the primary optical sight in the normal manner and observe and track the projected target image on the screen 18 without hindrance. The device may be powered from the weapon training simulator power supply. The detector 7 detects the laser beam when fired from the range finder and initiates the programmable delay timer. The delay timer is controlled by the target range data, stored, accessed and set from the automatic range module within the tank gunnery training simulator control console 23. Alternatively the target range can be set manually by an instructor either from the remote control 124 or manually on the training and test device itself. At the end of the delay time corresponding to the desired range the flash bulb 10 is flashed in order to simulate the laser beam reflection from the target. This flash is transmitted via the mirror 16 into the reflected laser beam radiation receiver on the tank and operates the associated range distance indicator which calculates the target range by measurement of the delay time between the emitted laser beam and the reflected simulated return signal. By means of the training or test device of the invention the tank laser range finder is made to indicate the correct apparent range of the projected target on the screen 18 and this range data is then used normally by the tank IFCS system. Thus the whole tank IFCS system can be utilised, with the exception of a live round in the weapon, to train the crew in full use of the IFCS system on the tank in a fully automatic gun laying mode.

In the foregoing the training and test device of the invention has been described as constructed for use with a tank in which the primary optical sight axis and the axis of the laser beam fire line are not coaxial but are laterally spaced. For use with tanks in which the primary optical sight line and the laser fire and return line of the laser range finder are coaxial the training or test device of the invention is modified so that the primary sight line is diverted through two pairs of periscope mirrors which are substantially coated to reflect visible light but transmit or allow through the laser range finder infra red energy which is then absorbed and diminished in the pulsed laser light trap of the device of the invention in the normal manner, detected by the detector 17 and used to provide a simulated reflected laser beam return signal through the primary optical sight to the reflected laser beam radiation receiver for operation of the associated range distance indicator.

We claim:

1. A training test device for a pulsed laser range finder having a reflected laser beam radiation receiver and an associated range distance indicator, which device includes a pulsed laser light trap having a housing attachable over an output aperture of the laser to receive and dissipate safely a beam of radiation therefrom without emission of an eye damaging amount of radiation, means in the housing for receiving an incident laser beam from the range finder, when fired, and for dissipating the received laser beam, at least one detector operable to register the presence of the laser beam in the housing and provide a corresponding output signal, a timer for receiving the output signal from the at least one detector and imparting a delay period to the output signal corresponding to the time normally taken for the laser beam to reach an object at a predetermined range and return therefrom, a source of a simulated return signal operable in response to the delayed output signal received from the timer to provide a simulated reflected laser beam return signal, and means for feeding the simulated return signal to the reflected laser beam radiation receiver for consequent operation of the associated range distance indicator.

2. A device according to claim 1, wherein the means for receiving and dissipating an incident laser beam include a first reflecting and diminishing surface locatable at 45° C. to the incident laser beam axis and a second reflecting and diminishing surface parallel to and spaced from the first reflecting and diminishing surface such that when the incident laser beam strikes the first reflecting and diminishing surface it is diminished in intensity and reflected onto the second reflecting and diminishing surface and from thence scattered and reflected to the detector.

3. A device according to claim 2, wherein the first and second reflecting and diminishing surfaces are each provided on a respective right angled prism both of which prisms are made from transparent plastics material loaded with black pigment.

4. A device according to claim 3, wherein the second reflecting and diminishing surface is provided with a plurality of depressions therein to aid scattering of the incident laser beam.

5. A device according to claim 1, wherein the source of a simulated return signal is a flash bulb located separately from the pulsed laser light trap.

6. A device according to claim 5, wherein the source of a simulated return signal includes an optical condensor, a diffuser screen, an image lens system and an adjustable image attenuator for controlling the signal presented to the means for feeding the simulated return signal to the reflected laser beam radiation receiver.

7. A device according to claim 1, including a source of power for the simulated return signal source.

8. A device according to claim 1, wherein the simulated return signal source is arranged and adapted to receive power from a tank gunnery training system.

9. A device according to claim 1, wherein the simulated return signal source is arranged and adapted to receive power from a tank power system.

10. A device according to claim 1, wherein the means for feeding the simulated return signal includes an aperture alignable with the input aperture of the reflected laser beam radiation receiver.

11. A device according to claim 10, wherein the aperture is constructed to communicate directly with the input aperture of the reflected laser beam radiation receiver when the device is intended purely for test purposes.

12. A device according to claim 10, wherein the aperture is constructed to communicate with the reflected laser beam radiation receiver via a primary optical sight associated with the pulsed laser range finder.

13. A device according to claim 12, wherein the means for feeding the simulated return signal to the reflected laser beam radiation receiver includes at least one semi-transparent partially reflecting mirror arranged so as to be at an angle of 45° C. to the line of sight of the primary optical sight when the device is operatively fitted as aforesaid such that a simulated return signal received from the flash bulb is reflected by the semi-transparent mirror along the line of sight of the primary optical sight for cooperation with a similar mirror in the optical which reflects the reflected simulated return signal into the reflected laser beam radiation receiver.

14. A device according to claim 13, wherein the two semi-transparent mirrors are coated to transmit visible light but reflect the laser range finder infra-red energy.

15. A device according to claim 1, wherein the timer is manually operable to provide a delayed period which can be selectively varied to correspond to a number of selected ranges.

16. A device according to claim 1, wherein the timer is constructed to receive a target range input from a tank gunnery training simulator so that the delay period is controlled and varied by said target range input.

* * * * *